(12) United States Patent
Masaki

(10) Patent No.: US 6,775,408 B1
(45) Date of Patent: Aug. 10, 2004

(54) IMAGE PROCESSOR

(75) Inventor: Kenji Masaki, Nagaokakyo (JP)

(73) Assignee: Minolta Co., Ltd., Osaka (JP)

(*) Notice: Subject to any disclaimer, the term of this patent is extended or adjusted under 35 U.S.C. 154(b) by 725 days.

(21) Appl. No.: 09/599,528

(22) Filed: Jun. 23, 2000

(30) Foreign Application Priority Data

Jun. 25, 1999 (JP) .......................................... 11-180433
Jun. 25, 1999 (JP) .......................................... 11-180442
Jun. 25, 1999 (JP) .......................................... 11-180544

(51) Int. Cl.$^7$ ................................................ G06K 9/00
(52) U.S. Cl. ..................................... 382/167; 382/168
(58) Field of Search ............................... 382/162, 167, 382/168, 274; 358/522

(56) References Cited

U.S. PATENT DOCUMENTS 5,461,457 A * 10/1995 Nakamura .................... 355/77

FOREIGN PATENT DOCUMENTS

| JP | 5-68167 | 3/1993 |
| JP | 6-46447 | 2/1994 |
| JP | 9-326941 | 12/1997 |
| JP | 10-302061 | 11/1998 |

* cited by examiner

Primary Examiner—Phuoc Tran
(74) Attorney, Agent, or Firm—McDermott Will & Emery LLP

(57) ABSTRACT

In the image processing of color image, color image data are received, and the color image data are corrected to maximize an overlapping quantity of histograms of the image data on a plurality of colors. Alternatively, color image data are received, and histograms of a plurality of colors on the color image data are calculated. Then, color deviation of image is corrected to maximize an overlapping quantity of the histograms. Alternatively, color image data are received, and color fog is detected on the color image data and a color of the color fog is determined. Then, the image data of the color on which color fog is detected is decreased. Alternatively, color fog is detected in an input color image data; and a color of the detected color fog is displayed. Alternatively, color fog of input image is corrected first, and contrast on the image is corrected next.

4 Claims, 12 Drawing Sheets

IMAGE PROCESSOR

This application is based on application Nos. 11-181433, 11-181442 and 11-180544 filed in Japan, the contents of which are hereby incorporated by reference.

BACKGROUND OF THE INVENTION

1. Field of the Invention

The present invention relates to image correction of color image.

2. Description of Prior Art

In an image processor, a color image is generally subjected to image correction. Various types of correction such as color balance control or color correction are performed.

Color fog is a phenomenon where a particular color covers an image so as to degrade color balance. In a typical example, it is observed when an object is captured under a fluorescent light without using a strobe light. Color fog is observed in many situations.

In order to recover normal color balance, it is known in image processing to convert the brightest portions to white and the darkest portions to black. This technique is simple, but effective. However, in many exceptional cases it may cause a reverse effect or has no effect.

In some image processing, color fog may be checked automatically at a step before the correction. However, when colors are checked automatically, erroneous decisions happen for an image such as a sunset scene or a photograph adopting intentional color representation.

In prior art image correction, contrast is corrected first, and color balance is adjusted next. In many cases, color balance can be adjusted mainly by correcting only contrast. Then, color balance is adjusted in an interactive way to a degree that the color balance is not anomalous when viewed with eyes. It is desirable that an image can be corrected automatically. However, there remain many problems on automatic processing.

SUMMARY OF THE INVENTION

An object of the present invention is to control color balance of an image more effectively in image processing.

Another object of the present invention is to check color fog in a user-friendly way in the image processing.

A further object of the present invention is to perform automatic image correction more effectively.

In one aspect of the invention, in the image processing of color image, color image data are received, and the color image data are corrected to maximize an overlapping quantity of histograms of the image data on a plurality of colors.

In another aspect of the invention, in the image processing of color image, color image data are received, and histograms of a plurality of colors on the color image data are calculated. Then, color deviation of image is corrected to maximize an overlapping quantity of the histograms.

In a different aspect of the invention, in the image processing of color image, color image data are received, and color fog is detected on the color image data and a color of the color fog is determined. Then, the image data of the color on which color fog is detected is decreased.

In a still different aspect of the invention, in the image processing of color image, color fog is detected in an input color image data; and a color of the detected color fog is displayed.

In a further aspect of the invention, in the image processing of color image, color fog of input image is corrected first, and contrast on the image is corrected next An advantage of the present invention is that automatic correction is more successful.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
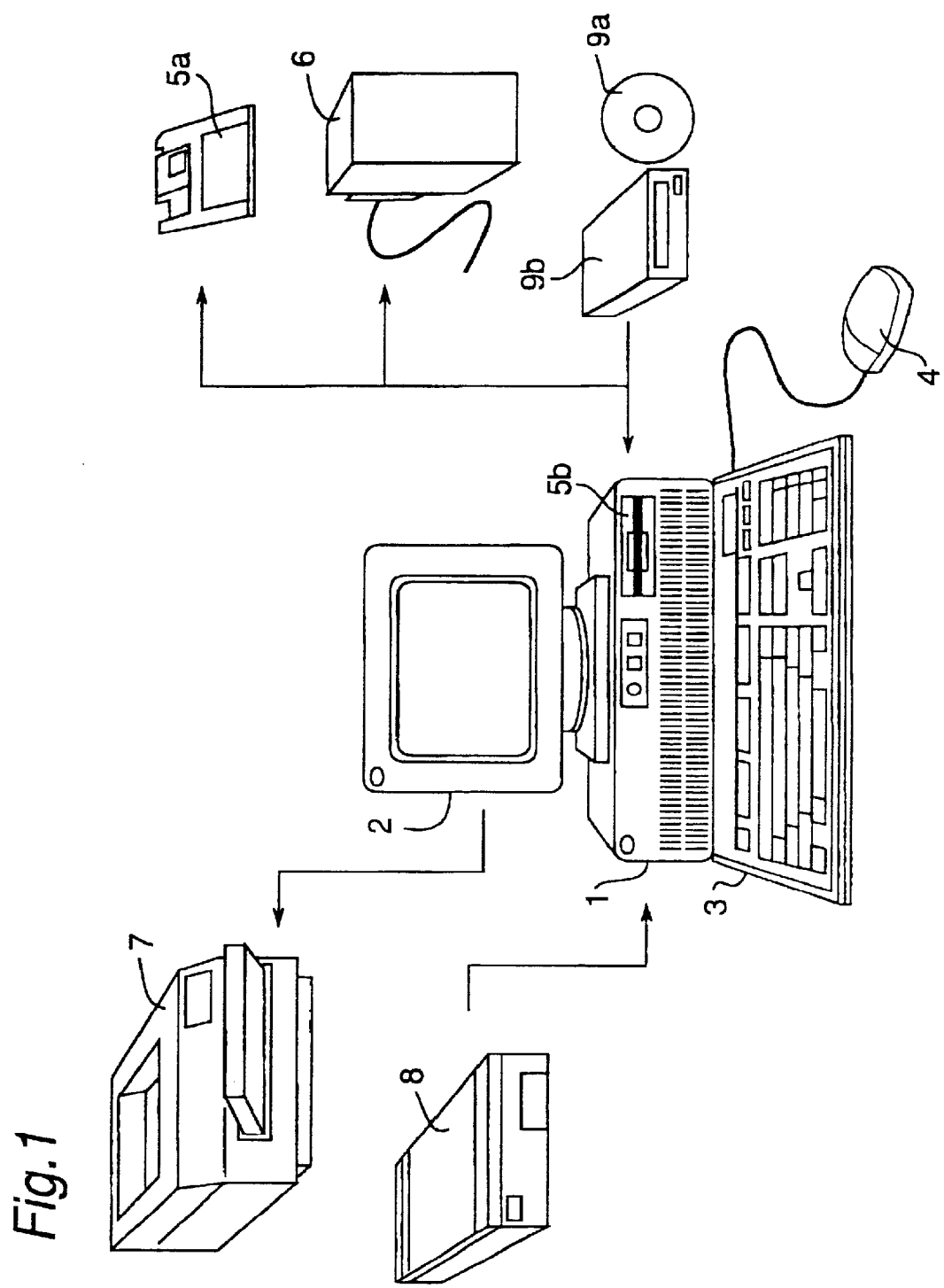
FIG. 1 is a diagram of an entire image processor.

Referring now to the drawings, wherein like reference characters designate like or corresponding parts throughout the several views, FIG. 1 shows an entire image processing apparatus according a first embodiment of the invention. It has a controller (computer) 1 which controls the entire apparatus, as a central component. In. FIG. 1, arrows show directions of data flow. A display device 2 displays a screen on an image or characters and various screens provided for operation or image processing. A keyboard 3 and a mouse 4 are used for various inputs and instructions by a user. A flexible disk 5 and a hard disk 6 are recording media for storing, for example, image data, attribute information and programs. The apparatus has a flexible disk drive and a hard disk drive for accessing the flexible disk 5 and the hard disk 6. A printer 7 prints image data or the like on a paper. A scanner 8 reads image data of a document. A CD-ROM 9 is a recording medium for storing various data or programs, and the apparatus has a CD-ROM drive for accessing the CD-ROM 9. Programs explained later are read from an external recording medium such as a CD-ROM.

Figure 2:
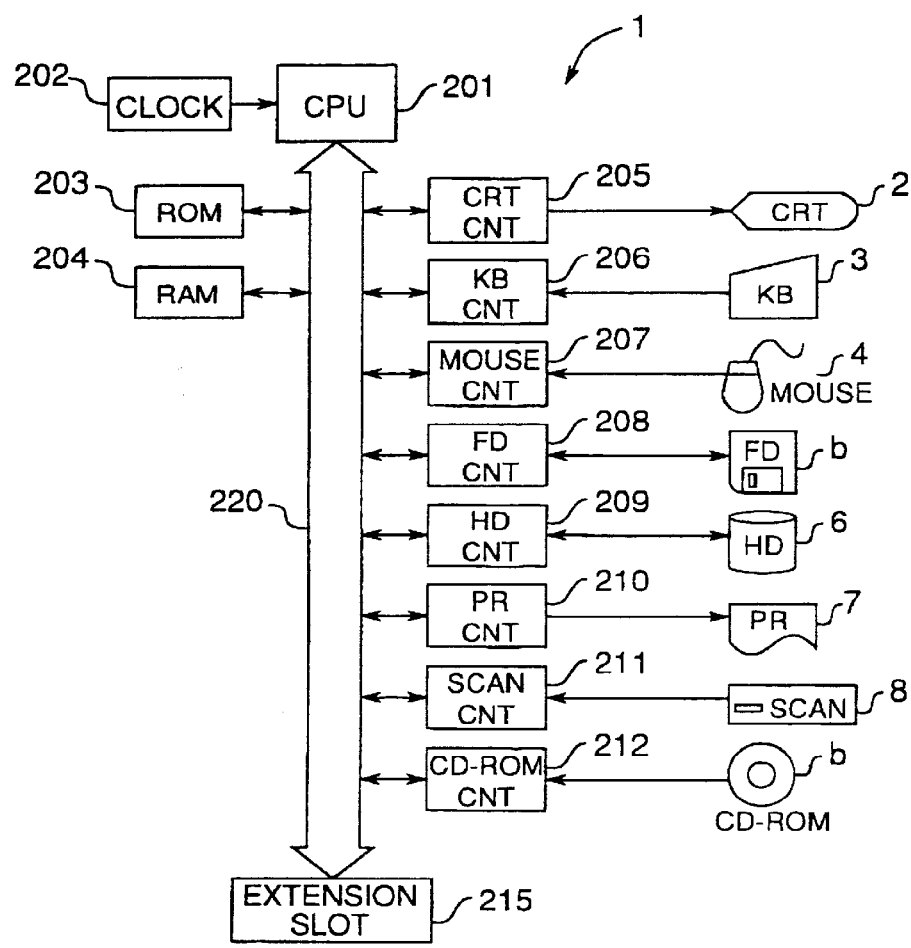
FIG. 2 is a block diagram of a controller and thereabout.

FIG. 2 is a block diagram of the controller 1 and thereabout. The controller 1 has a central processing unit (CPU) 210, and it is connected via a bus 220 to a read-only-memory (ROM) 203 for storing various data and a random access memory (RAM) for storing various data and programs. Further, it is also connected via the bus 220 to a display controller 205 for displaying images and characters on a screen of the display apparatus 2, a keyboard controller 206 for controlling key-input from the keyboard 3, a mouse controller for controlling an input from the mouse 4, a flexible disk controller 208 which controls the flexible disk drive, a hard disk controller 209 for controlling the hard disk 6, a printer controller 210 which controls outputs to the printer 7, a scanner controller 211 which controls the scanner 8, and a CD-ROM drive controller 212 which controls the CD-ROM drive. Further, in the controller, a clock circuit 202 generates various clock signals for operating the apparatus. Further, extension slots 215 are connected to the bus for connecting various extension boards to which for example, a SCSI board is connected for connecting a flexible disk drive, a hard disk drive, a scanner, a CD-ROM drive or the like. In this apparatus, the flexible disk 5 and the hard disk 6 are used as recording media, but other recording medium such as a magneto-optical disk may also be used. The scanner 8 and the CD-ROM 9 are used for inputting image data, but another input devise such as a still video camera may also be used. The printer 7 is used as an output device, but a digital copying machine or the like may also be used.

This apparatus processes a full color image. In image correction, image data stored in an image memory is subjected to correction. When an instruction of starting image correction is inputted by a user, a routine for image correction is evoked. The image correction routine further includes image file input/output processing, image data display processing, a graphic user interface processing for image correction operation, error processing in the graphic user interface processing, and resolution change processing, but they are not explained here. The structures of the image processing apparatus shown in FIGS. 1 and 2 are common in other embodiments which will be explained later.

Figure 3:
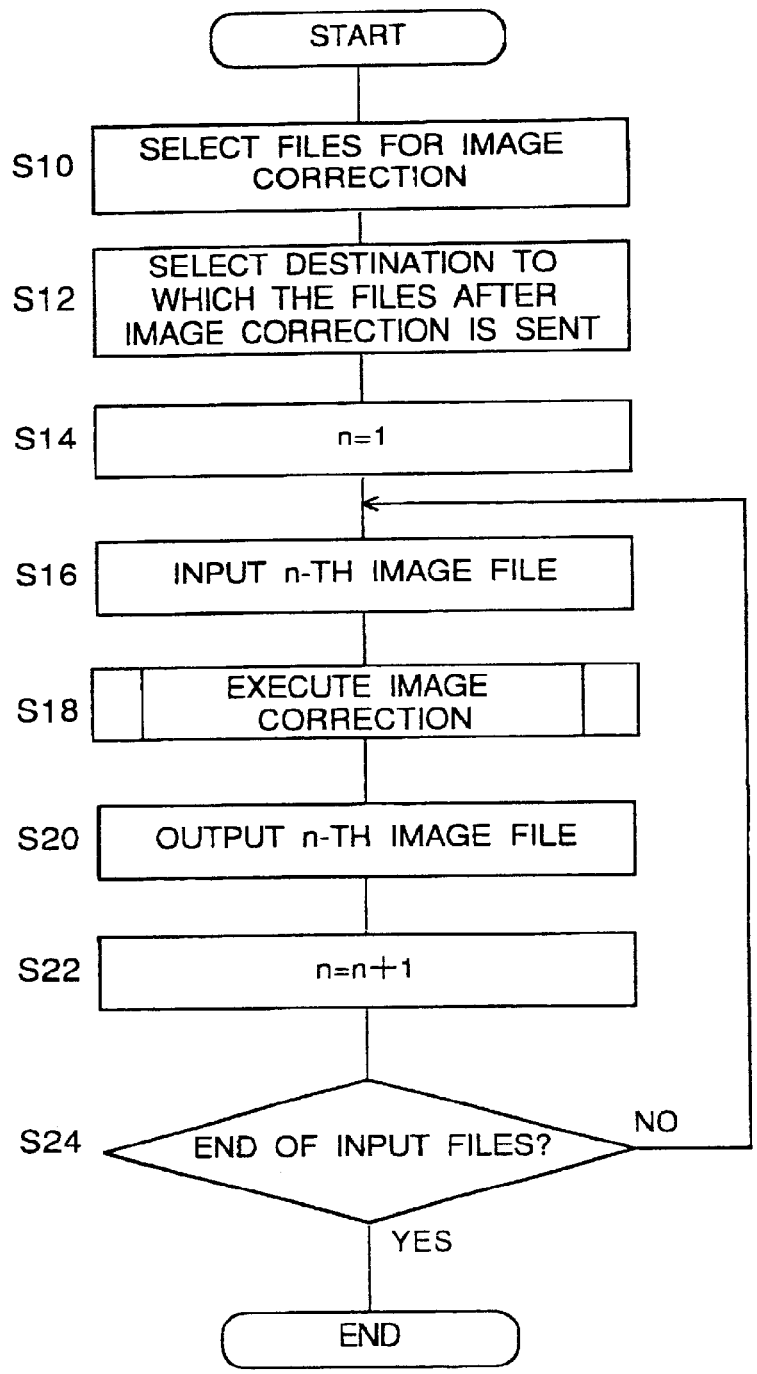
FIG. 3 is a main flowchart of image correction of a first embodiment of the invention.

FIG. 3 shows a main flowchart of the image correction by the controller 1. In the image correction, when color balance is adjusted, correction is performed so as to maximize overlap of histograms of red (R), green (G) and blue (B).

First, files for image correction are selected (step S10), and output destinations of the files after image correction are selected (step S12). Then, the selected files are read successively and subjected to image correction. First, a variable n for representing an image file is set to one (step S14), and an n-th image file is inputted (step S16). Next, image correction is executed on the image data in the file (step S18), and the result is outputted to the n-th image file (step S20). In this embodiment, as will be explained later, at step S18, the image is corrected so as to maximize the overlap of the R, G, B histograms.

Next, the variable n is incremented by one (step S22), and it is decided if all the input files have been processed (step 524). If all the input files have not yet been processed, the flow returns to step S16, and the above processing is repeated on a next image file.

Figure 4:
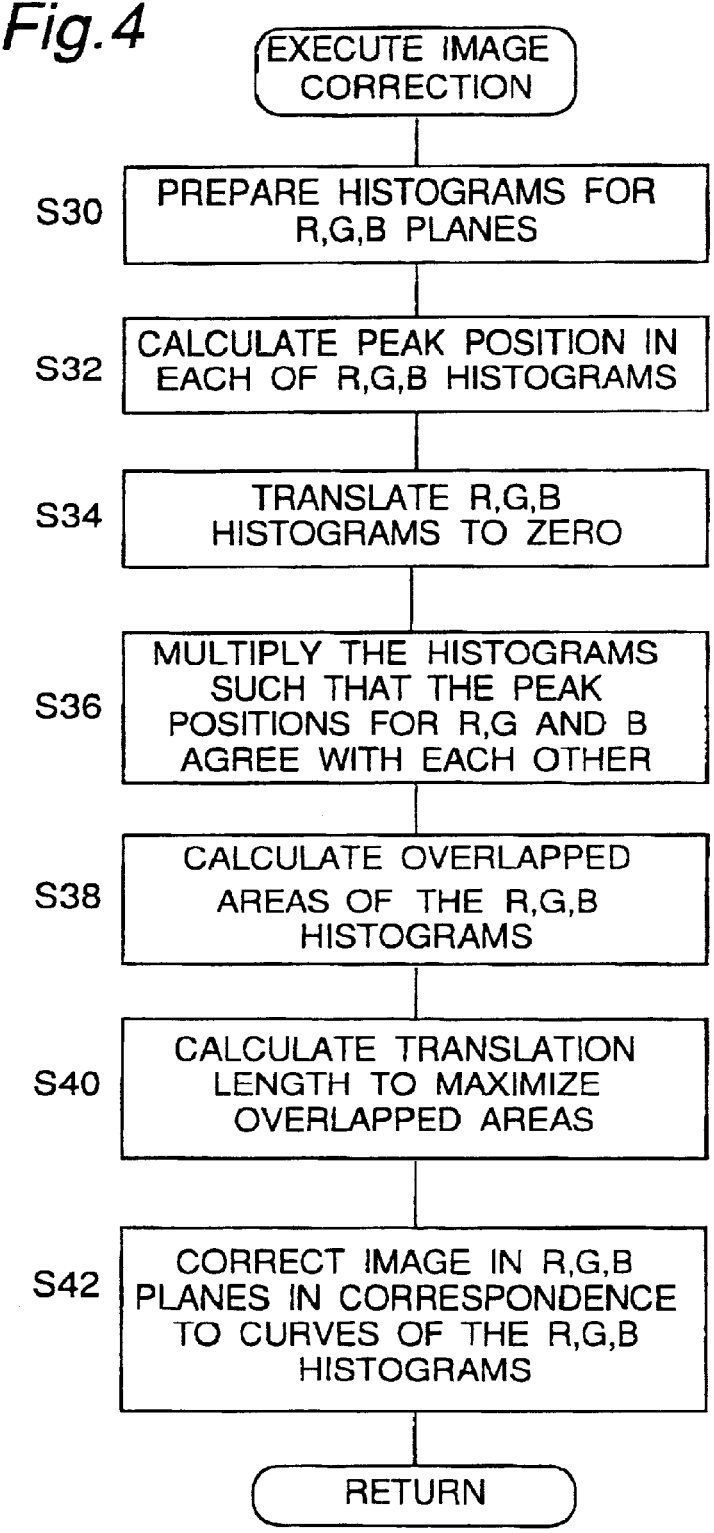
FIG. 4 is a flowchart of image correction.

FIG. 4 shows a flow of execution of image correction (step S18 in FIG. 3) wherein the image is corrected so as to maximize the overlap of the R, G, B histograms. First, histograms of the input image data are prepared for each of R, G, B planes (step S30), and peaks of the R, G, B histograms are calculated (step S32). Next, parallel movement to point O in the R, G, B histograms is performed (step S34). Next, the histograms are multiplied with factors so as to make the peaks in the R, G and B histograms agree with each other (step S36). Next, overlapping areas of the histograms are calculated (step S38). Next, parallel move quantities are calculated so as to maximize the overlapping areas of the R, G, B histograms (step S40), as explained below. First, overlapping areas of the R, G, B histograms are calculated. Next, centers of gravity are calculated, and the two histograms are moved so as to match with the histogram having the largest center of gravity in the R, G, B histograms. Next, overlapping areas are calculated by shifting the above-mentioned moved histograms one step by one step relative to the reference histogram. Next, color balance correction is performed for each of R, G, B planes according to the curves of the R, G, B histograms (step S42), as explained below. By comparing the histograms having the largest overlapping areas with the original histograms, parallel move quantities and magnifying factors are calculated for each of the R, G, B planes according to gradations thereof, and each pixel is processed according to the gradation.

Next, a second embodiment of the invention is explained. This embodiment is similar generally to the first embodiment explained above, but, in this embodiment, color fog is detected in the image correction (step S18 in FIG. 3).

Figure 5:
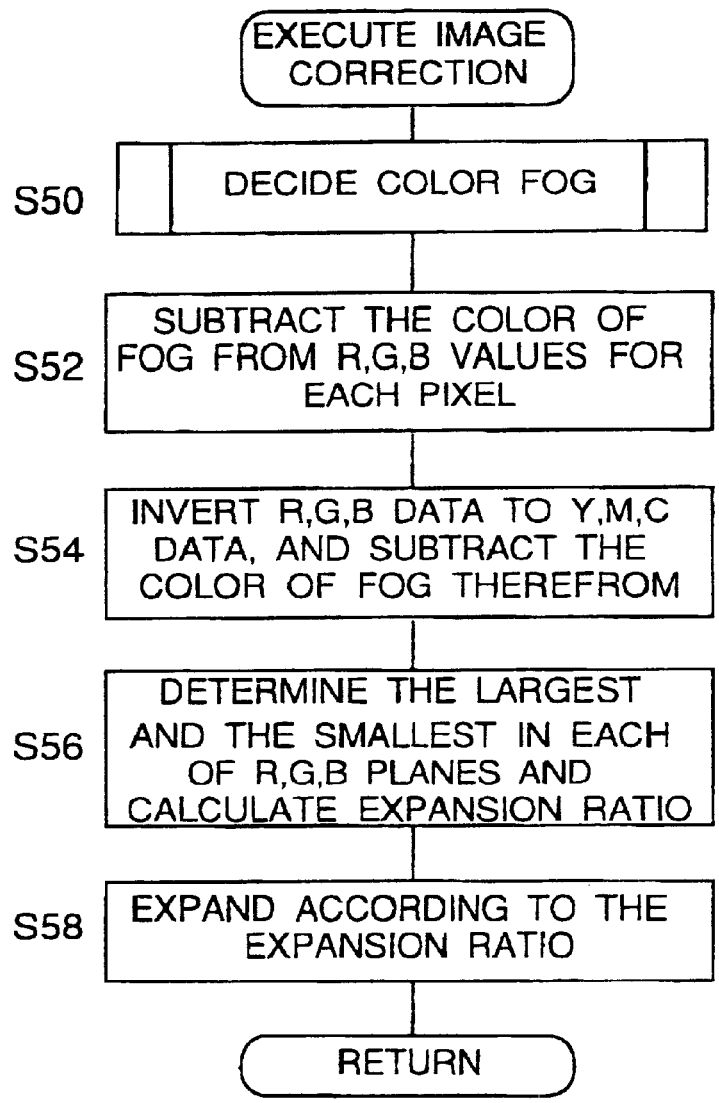
FIG. 5 is a flowchart of image correction of a second embodiment of the invention.
Figure 6:
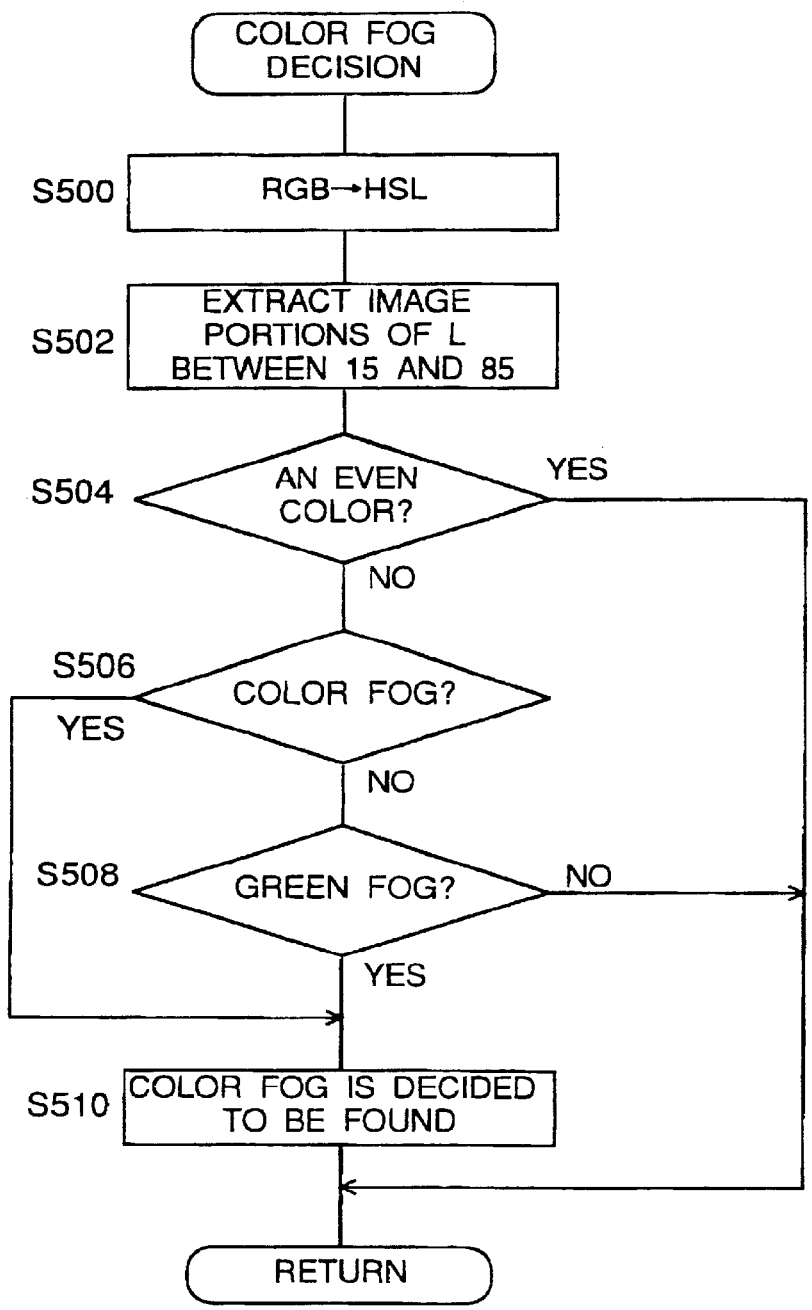
FIG. 6 is a flowchart of color fog detection.

FIG. 5 shows a flow of the image correction in the second embodiment. First, color fog is decided (step S50). Color fog is a phenomenon where a particular color covers an image to degrade color balance. The color fog detection is performed as shown in FIG. 6. First, R, G, B data of the image are converted to H, S, L data (step S500). Then, a portion having an area color of L of about 15 to 85 is extracted in the image (step S502). In the decision of color fog, it has to be considered to exclude an object having an even color (exclusion of even color). Then, it is decided whether 85% or more of all the pixels are included in a specified area (of area width of about 20 degrees) in hue (H) (step S504). If it is decided that 85% or more of all the pixels are included in the specified area, it is decided that color fog is not found, but an even color exists. Next, it is decided whether 85% or more of all the pixels are included in a specified area (of area width of about 50 degrees) in hue (H) (step S506). If it is decided that 85% or more of all the pixels are included in the specified area, it is decided that color fog of the color happens. Further, green fog is checked (step S508). Because green fog has a tendency that it extends more than color fog of the other colors, it is checked by widening the area width to about 90 degrees. If it is decided that 85% or more of all the pixels are included in the specified area, it is decided that green fog happens. Otherwise it is decided that color fog is not found. Finally, the color on which color fog is decided to happen is converted to RGB space, and the highest in R, G, B values is decided as the color of color fog (step S510).

Returning to FIG. 5, subtraction by the color of color fog is performed (step S52). In concrete, each pixel has R, G, B values, and the color having the highest value is decided as the color of color fog. For example, if R=200, G=180 and B=130, the color of color fog is R, and its value is 200. The above-mentioned subtraction means that 20 is subtracted from 200 to give a result 180. Thus, R=180, G=180 and B=130.

Figure 7:
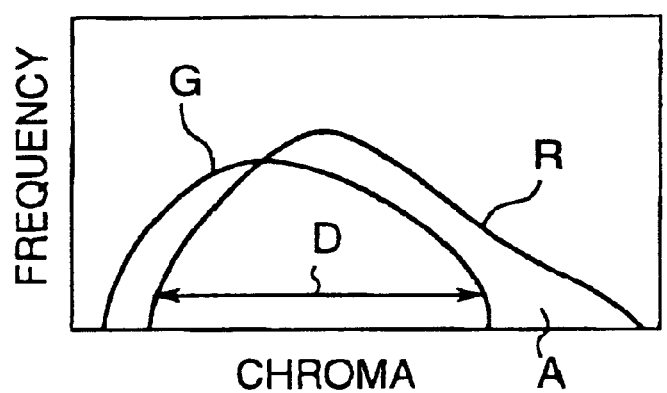
FIG. 7 is a diagram for explaining movement of histogram.

The above-mentioned movement of histograms is explained here with reference to an example shown in FIG. 7. For the brevity of explanation, only R and G are considered among R, G and B. In FIG. 7, R histogram extends to higher values. Point "p" has R=230 and G=180. It is assumed here that point "p" exists in an area represented as "A" in FIG. 7. Then, if R is decreased to the same level as G, this means that a point in the histogram in correspondence to point "p" is decreased and moved to somewhere in area D.

Next, R, G, B data are converted to Y, M C data, and the color of color fog is subtracted therefrom (step S54). Excessive color in R, G and B can be corrected in the above-mentioned processing to step S52. However, a color in a small amount cannot be corrected. Then, such a color is corrected by converting R, G, B data to Y, M C data, and similar processing is performed thereon.

Next, the largest and smallest are determined in each of R, G, B planes, and magnifying powers therefor area calculated (step S56). Then, magnification is performed according to the magnifying powers of the R, G, B planes (step S58). In the image processing, color fog is deleted by reducing colors, so that there is a tendency that the image becomes darker than the original one. Then, in order to correct this tendency, contrast correction on the entire image is performed at steps S56 and S58.

In steps S56 and S58 in the second embodiment, lightness is corrected for maintaining the brightness. Alternatively, histograms may be enlarged so as to agree the peak positions of the histograms.

In the above-mentioned embodiments, it is assumed that each pixel has R, G and B values. However, a Bayer arrangement used for a charge-coupled device may also be applicable.

In the above-mentioned embodiments, when overlapping areas of R, G, B histograms become maximum, it is found that a reverse effect is not liable to happen to generate a stable good image. Automatic correction has a higher success rate because failures and excessive correction can be avoided. Because reverse effect can be avoided practically, the invention is effective especially for automatic image correction after automatic detection of color deviation.

Next, a third embodiment of the invention is explained. In this embodiment, in color fog check, color deviation (color difference) is automatically checked, and the check result is presented to a user as a color patch and user's input is waited. The check result is displayed to a user with a color, and a user can instruct the processing on the image. Because user's correction is accepted on the automatic check result, an error of the result is decided by a user. Then, success rate of the correction becomes higher. In this way, image correction can be performed more user-friendly.

Figure 8:
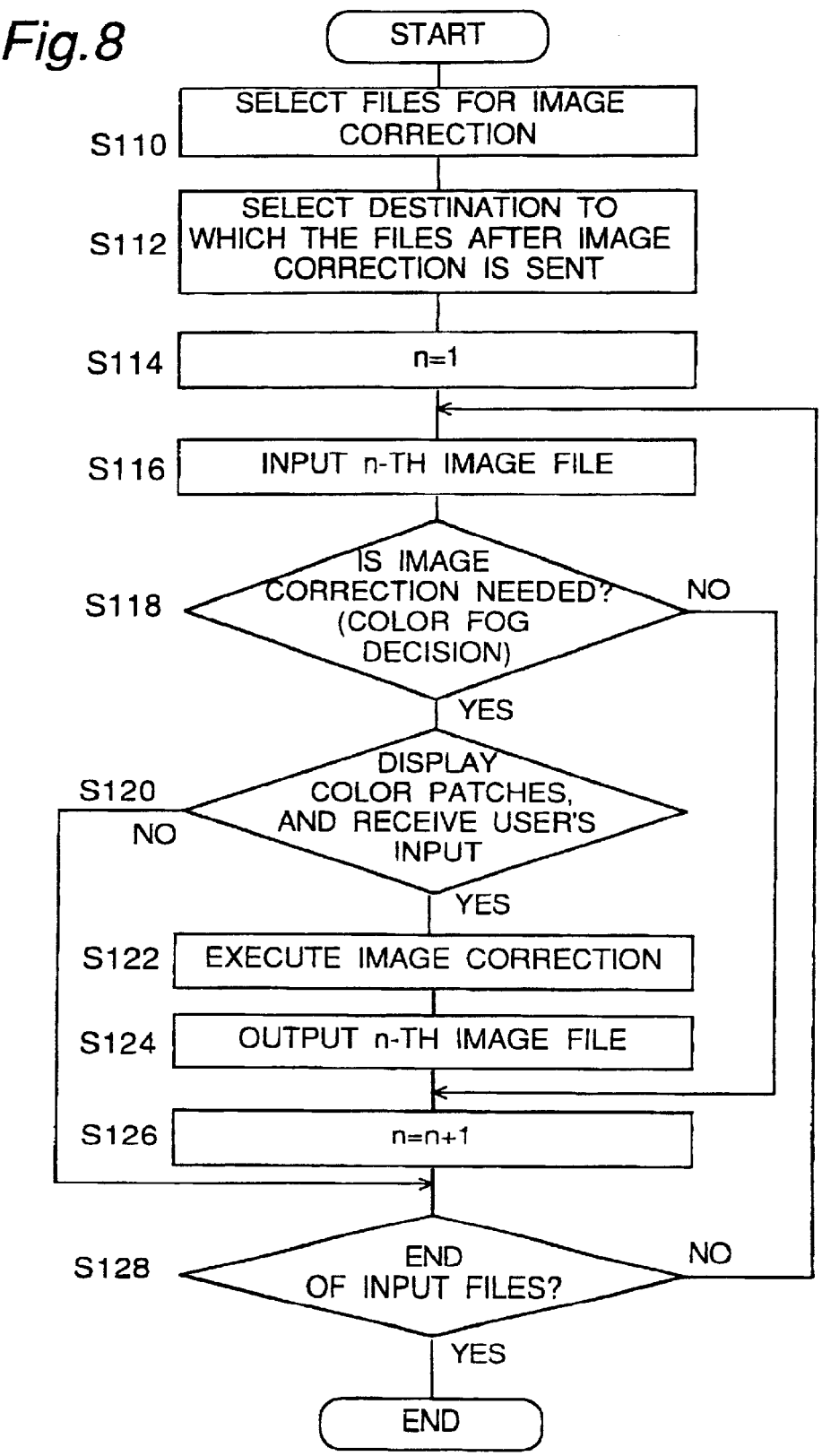
FIG. 8 is a flowchart of image correction in a third embodiment of the invention.

FIG. 8 shows a main flowchart of the image processing by the controller 1, wherein a color, patch on the color of color fog obtained as a result of automatic detection is presented for user's decision. First, files for image correction are selected (step S110), and output destinations of the files after image correction; are selected (step S112). Then, the selected files are read successively and subjected to image correction. First, a variable n for representing an image file is set to one (step S114), and an n-th image file is inputted (step S116). Next, it is checked whether image correction is necessary or not (step S118), wherein the original image is analyzed to decide color deviation due to color fog automatically. The decision of color deviation is the same as that shown in FIG. 6, and the explanation is not repeated here. When it is decided at step S118 that color fog occurs, a center value of the color of color fog is displayed as a color patch (step S120) and user's input is waited. Further, an original preview image corrected according to color fog information obtained by the color fog decision, and another preview image after correction are presented to the user besides the color patch. In this example, the result is displayed in a screen of the display apparatus 2, but it may also be outputted to the printer 7.

Figure 9:
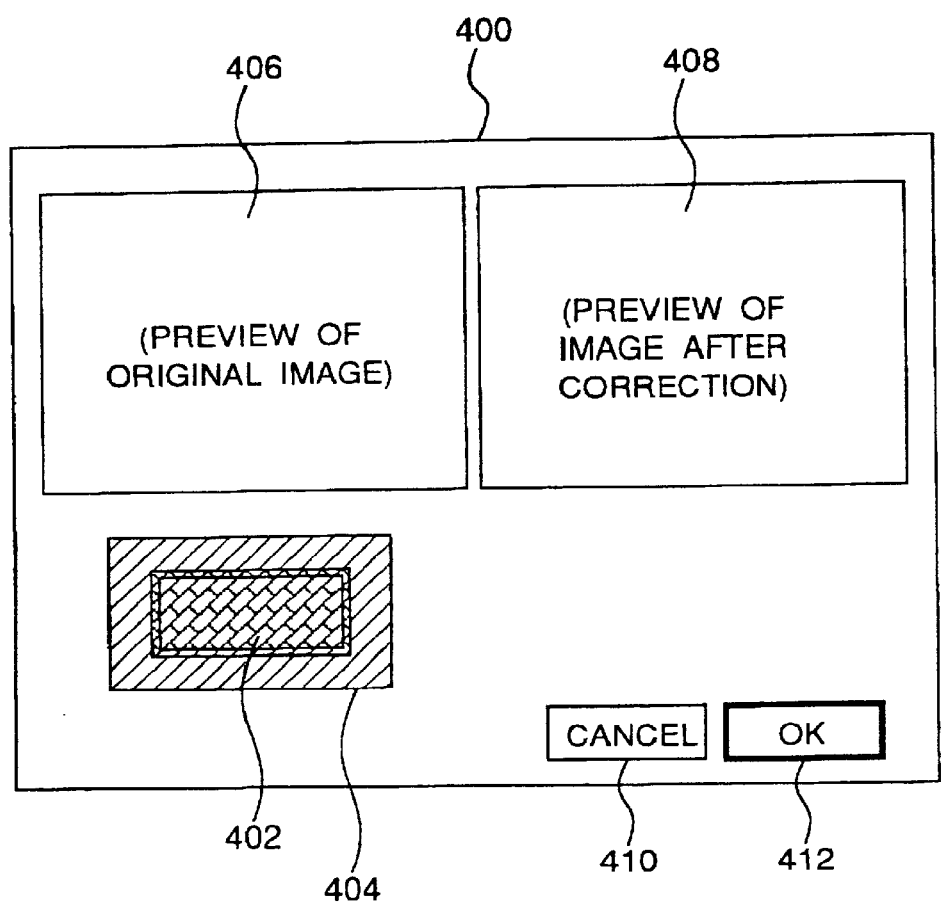
FIG. 9 is a diagram of an example of a screed for displaying a color patch and for receiving user's input.

FIG. 9 shows an example of color patch presentation. In the screen 400 shown in FIG. 9, a central value of the color of color fog determined as explained above is presented at a lower side as a color patch 402 as a sample of color deviation detected automatically. In this case, it is preferable that the color of background 404 of the color patch 402 is darker than gray because impression of a color is affected by background of a lighter color. Further, at the upper side in the screen, an original preview image 406 and a preview image 408 after the correction are presented in parallel. A button 410 for canceling the result of automatic decision and another button 412 for admitting the correction are provided at the bottom side of the screen for user's instruction. As explained above, the color deviation detected automatically is presented to the user as the color patch 402, and user's input is received with the button 410 or 412.

Returning to FIG. 8, when the button 412 is selected by the user to accept the preview image after correction, the image correction is executed (step S122), and the result is outputted to the n-th image file (step S124). On the contrary, when the button 410 is selected by the user to cancel the preview image after correction, image correction is not executed.

Next, the variable n is incremented by one (step S126), and it is decided if all the input files have been processed (step S128). If all the input files have not yet been processed, the flow returns to step S116, and the above processing is repeated on all the selected image files.

In this embodiment, preview images are presented, but they may not be presented. Further, a color patch after correction may also be presented at the same time as the color patch of the color of color fog. Besides the color patch, a name of a particular color such as magenta or orange may be presented at the same time as the color patch. The area of the color fog may be presented as a numerical value beside the color patch.

If a plurality of color fogs are detected, it is favorable to present color patches of the plurality of color fogs. In such a case, the buttons for user's instuction may be provided for each color fog. The correction is performed only on a color or colors selected by the user.

In this embodiment, it is an advantage that success rate of detection can be increased by accepting user's instruction on the result of automatic decision on color fog.

Next, a fourth embodiment of the invention is explained. In the automatic image correction, it is necessary to analyze an image in order to determine a correction quantity. In this embodiment, contrast and color balance are checked. Contrast check is more difficult than color balance check. Then, if contrast is corrected first, the precision of color balance check is liable to become lower. Therefore, it is desirable to perform color balance correction before contrast correction.

A main flowchart of the image correction by the controller 1 is similar to that of the first embodiment shown in FIG. 3, and the explanation thereon is not repeated here.

Figure 10:
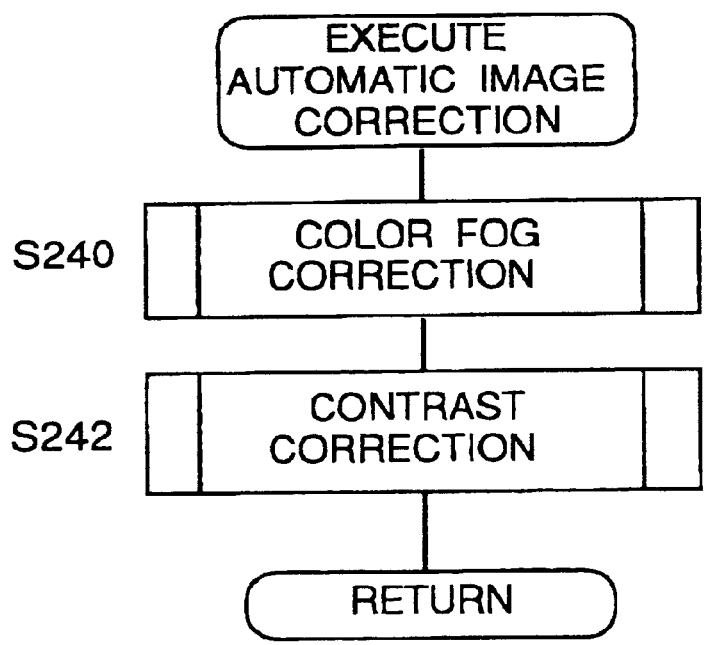
FIG. 10 is a flowchart of automatic image correction in a fourth embodiment of the invention.

FIG. 10 is a flowchart of the execution of automatic image correction (step S6 in FIG. 3). First, color fog correction is performed (step S240), and contrast correction is performed thereafter (step S242).

Figure 11:
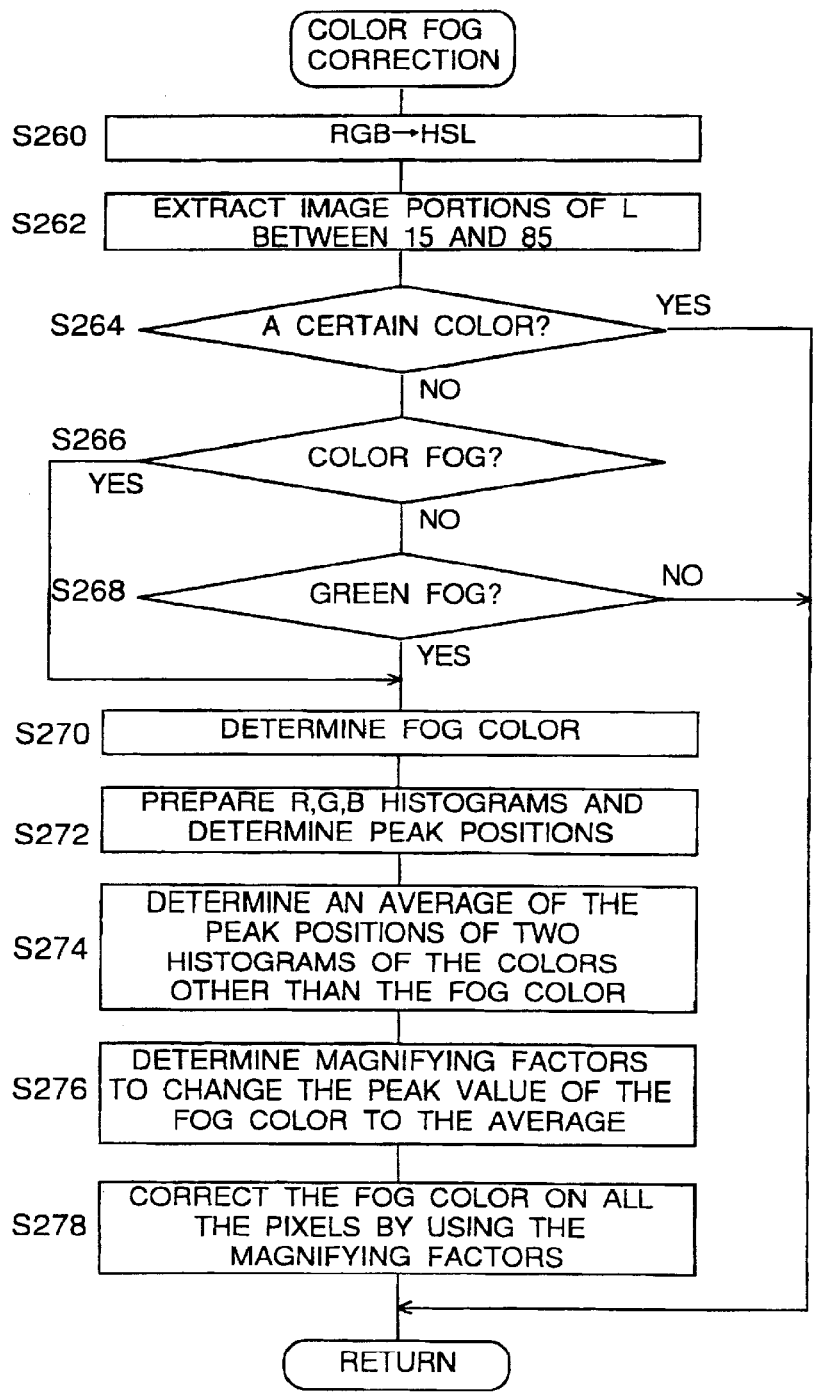
FIG. 11 is a flowchart of color fog correction.

FIG. 11 shows a flowchart of the color fog correction (step S240 in FIG. 10). The decision of color deviation is performed first (steps S260–S270). Because this decision processing is the same as that shown in FIG. 6, the explanation is not repeated here. After the color fog or color deviation is detected, color is corrected on the color of color fog. First, R, G, B histograms are prepared, and peak positions thereof are determined (step S272). Next, an average of the peak positions of two histograms other than the histogram of the color of color fog (step S274), and a magnifying factor is determined for decreasing the peak position for the color of color fog to the average (step S276). Then, the color of color fog is corrected on data of all the pixels by using the magnifying factor (step S278).

Figure 12:
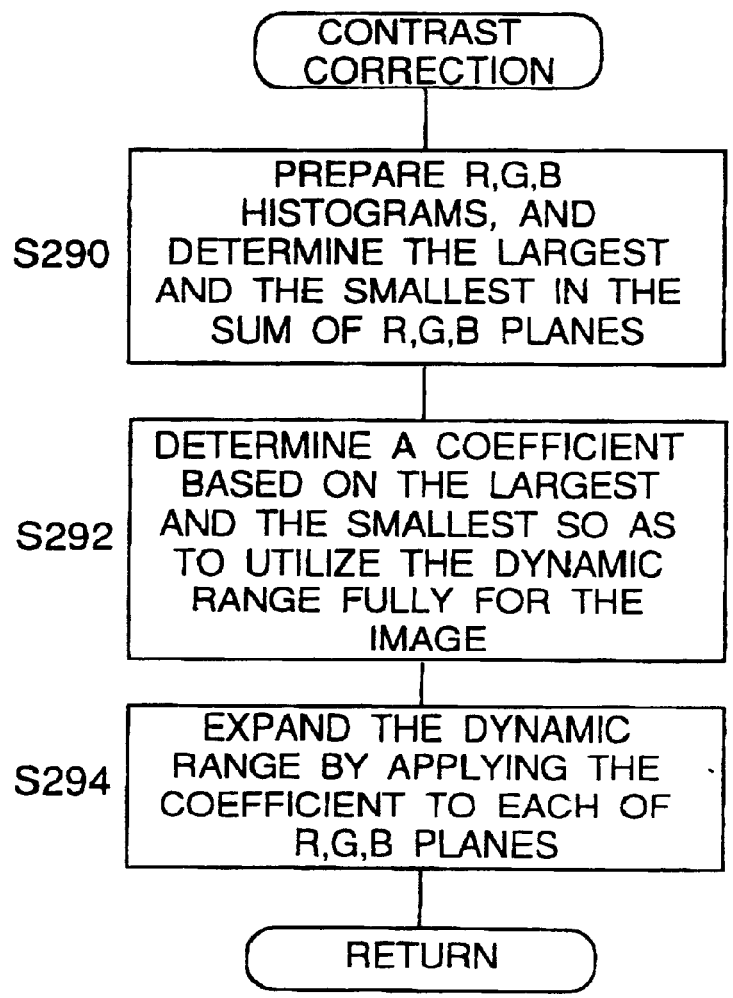
FIG. 12 is a flowchart of contrast correction.

FIG. 12 is a flowchart of contrast correction (step S242 in FIG. 10). First, R, G, B histograms are prepared, and the largest and smallest values of a sum of R, G, B planes are determined (step S290). Next, a coefficient K is determined to used the whole dynamic range of image for the largest and smallest values (step S292). The, the dynamic range is expanded by applying the coefficient K to each of R, G, B planes (S294).

It is an advantage of the image correction of the embodiment is that image correction which has been performed manually can be performed automatically at a high precision.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:

a data input device which receives color image data; and an image corrector which corrects the color image data received by said data input device to maximize an overlapping quantity of histograms of the image data on a plurality of colors.

2. An image processor comprising:

a data input device which receives color image data;

a histogram generator which calculates histograms of a plurality of colors on the color image data received by said data input device; and an image corrector which corrects color deviation of image to maximize an overlapping quantity of the histograms.

3. A computer readable storage medium storing a program comprising the steps of:

receiving color image data; and correcting the color image data to maximize an overlapping quantity of histograms of the image data on a plurality of colors.

4. A computer readable storage medium storing a program comprising the steps of:

receiving color image data;

calculating histograms of a plurality of colors on the color image data; and correcting color deviation of image to maximize an overlapping quantity of the histograms.

* * * * *